United States Patent
Kang et al.

(10) Patent No.: US 11,768,395 B2
(45) Date of Patent: Sep. 26, 2023

(54) DISPLAY DEVICE

(71) Applicant: LG ELECTRONICS INC., Seoul (KR)

(72) Inventors: Seunggyu Kang, Seoul (KR); Hyuncheol Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 230 days.

(21) Appl. No.: 17/156,054

(22) Filed: Jan. 22, 2021

(65) Prior Publication Data
US 2021/0263373 A1    Aug. 26, 2021

(30) Foreign Application Priority Data

Feb. 25, 2020    (KR) .................. 10-2020-0023197

(51) Int. Cl.
*G02F 1/1333*    (2006.01)

(52) U.S. Cl.
CPC .. *G02F 1/133314* (2021.01); *G02F 1/133322* (2021.01)

(58) Field of Classification Search
CPC ......... G02F 1/133314; G02F 1/133322; G06F 2200/1612; G06F 1/20; G06F 1/1601; H01L 27/32; H01L 51/52
See application file for complete search history.

(56) References Cited

U.S. PATENT DOCUMENTS

2015/0261035 A1*  9/2015  Bae ................... G02F 1/133308
                                                                349/58
2021/0116958 A1*  4/2021  Ryu ................... H01L 51/5246

FOREIGN PATENT DOCUMENTS

| JP | 2018001245 | 1/2018 |
|---|---|---|
| KR | 1020200034374 | 4/2005 |
| KR | 1020080001114 | 1/2008 |
| KR | 101282125 | 7/2013 |
| KR | 1020150056562 | 5/2015 |
| KR | 20150116622 A * | 10/2015 |
| KR | 1020150116622 | 10/2015 |
| KR | 1020200010821 | 1/2020 |

OTHER PUBLICATIONS

PCT International Application No. PCT/KR2021/000853, International Search Report dated May 20, 2021, 3 pages.
Korean Intellectual Property Office Application No. 10-2020-0023197, Office Action dated Jul. 23, 2021, 6 pages.

* cited by examiner

*Primary Examiner* — Michael H Caley
*Assistant Examiner* — Agnes Dobrowolski
(74) *Attorney, Agent, or Firm* — LEE HONG DEGERMAN KANG WAIMEY

(57) ABSTRACT

A display device is disclosed. The display device includes a display panel, a frame positioned behind the display panel, a plate positioned between the display panel and the frame, and a first adhesive member disposed between the display panel and the plate and coupled both to the display panel and to the plate, wherein the plate includes a body facing the display panel, and a depressed portion, which is depressed rearwards from the body and to which the first adhesive member is coupled.

11 Claims, 19 Drawing Sheets

DISPLAY DEVICE

CROSS-REFERENCE TO RELATED APPLICATION

Pursuant to 35 U.S.C. § 119(a), this application claims the benefit of earlier filing date and right of priority to Korean Patent Application No. 10-2020-0023197, filed on Feb. 25, 2020, the contents of which are hereby incorporated by reference herein in its entirety.

BACKGROUND OF THE INVENTION

1. Field of the Invention

The present disclosure relates to a display device.

2. Description of the Related Art

With the development of the information society, demand for various kinds of display devices is increasing. In response to these needs, various kinds of display devices, such as LCDs (Liquid Crystal Display Devices), PDPs (Plasma Display Panels), ELDs (Electro luminescent Displays) and VFDs (Vacuum Fluorescent Displays), have been recently researched and used.

Among these, a display device using OLED (Organic Light-Emitting Diode) has an advantage in that the display device is excellent in brightness and viewing angle properties compared to an LCD device and does not require a backlight unit, thereby realizing an extremely slim device.

In order to follow recent trends in the development and consumption patterns of display devices, research with the goal of making display devices thinner and lighter has been intensively conducted.

Furthermore, research on a structure of a display device capable of preventing deterioration of image quality, such as an afterimage on a screen, which is caused by an excessive increase in the temperature of a display panel due to heat generated during operation of the display device, has been intensively conducted.

SUMMARY OF THE INVENTION

Therefore, the present disclosure has been made in view of the above problems, and it is an object of the present disclosure to provide a display device capable of preventing the temperature of a display panel from excessively rising by reducing the distance between the display panel and a plate serving as a radiating plate.

Another object of the present disclosure is to provide a display device capable of reducing the distance between the plate and the display panel by forming a step at at least a portion of the plate in consideration of the thickness of the adhesive member coupled both to the display panel and to the plate.

In accordance with an aspect of the present disclosure, the above and other objects can be accomplished by the provision of a display device including a display panel, a frame positioned behind the display panel, a plate positioned between the display panel and the frame, and a first adhesive member disposed between the display panel and the plate and coupled both to the display panel and to the plate, wherein the plate includes a body facing the display panel and a depressed portion, which is depressed rearwards from the body and to which the first adhesive member is coupled.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

A description will now be given in detail according to exemplary embodiments disclosed herein, with reference to the accompanying drawings. For the sake of brevity of description with reference to the drawings, the same or equivalent components are denoted by the same reference numbers, and a description thereof will not be repeated.

In general, suffixes such as "module" and "unit" may be used to refer to elements or components. The use of such suffixes herein is merely intended to facilitate description of the specification, and the suffixes do not have any special meaning or function.

In the present disclosure, that which is well known to one of ordinary skill in the relevant art has generally been omitted for the sake of brevity. The accompanying drawings are used to assist in easy understanding of various technical features, and it should be understood that the embodiments presented herein are not limited by the accompanying drawings. As such, the present disclosure should be construed to extend to any alterations, equivalents and substitutes, in addition to those which are particularly set out in the accompanying drawings.

It will be understood that although the terms "first," "second," etc. may be used herein to describe various elements, these elements should not be limited by these terms. These terms are only used to distinguish one element from another.

It will be understood that when an element is referred to as being "connected with" another element, intervening elements may be present. In contrast, it will be understood that when an element is referred to as being "directly connected with" another element, there are no intervening elements present.

A singular representation may include a plural representation unless the context clearly indicates otherwise.

In the present application, it should be understood that the terms "comprises," "includes," "has," etc. specify the presence of features, numbers, steps, operations, elements, components, or combinations thereof described in the specification, but do not preclude the presence or addition of one or more other features, numbers, steps, operations, elements, components, or combinations thereof.

Figure 1:
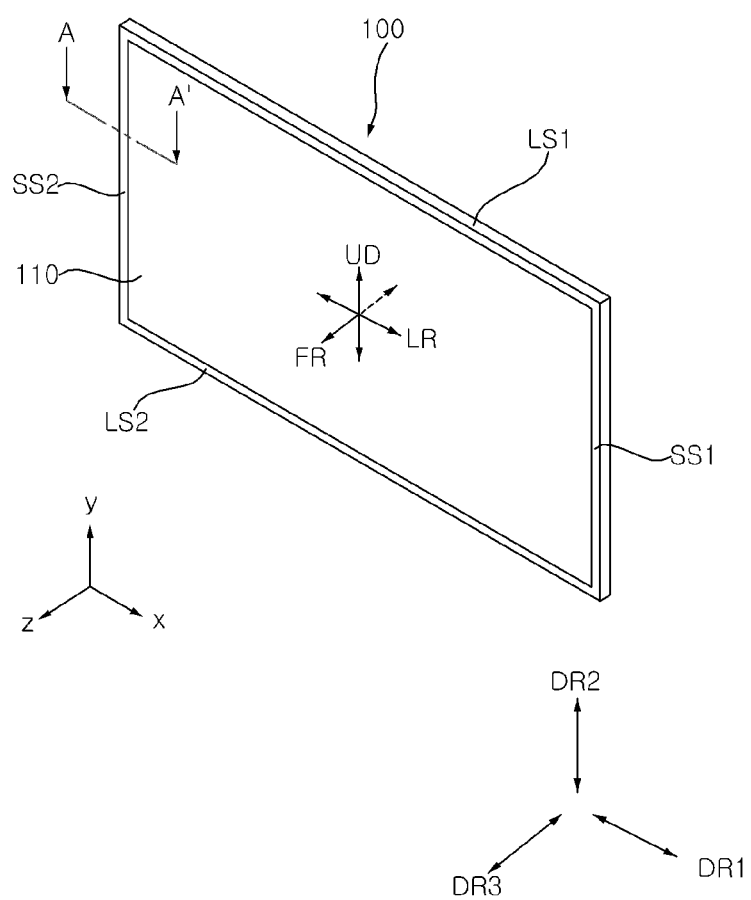
FIGS. 1 to 19 are views illustrating display devices according to embodiments of the present disclosure.

Referring to FIG. 1, the display device 100 may include a display panel 110. The display panel 110 may display a screen.

The display panel 110 may include a first long side LS1, a second long side LS2, which faces the first long side LS1, a first short side SS1 adjacent to the first long side LS1 and the second long side LS2, and a second short side SS2, which faces the first short side SS1. Although each of the first and second long sides LS1 and LS2 is illustrated and described as being longer than each of the first and second short sides SS1 and SS2 for convenience of explanation, the length of each of the first and second long sides LS1 and LS2 may be almost the same as that of each of the first and second short sides SS1 and SS2.

A direction parallel to the first and second long sides LS1 and LS2 of the display panel 110, may be referred to as a first direction DR1 or a lateral direction LR. A direction parallel to the first and second short sides SS1 and SS2 of the display panel 110, may be referred to as a second direction DR2 or a vertical direction UD. A direction perpendicular to the first and second long sides LS1 and LS2 and the first and second short sides SS1 and SS2 of the display panel 110 may be referred to as a third direction DR3 or an anteroposterior direction FR. Here, the direction in which the display panel 110 displays an image may be referred to as a forward direction, and the direction opposite the forward direction may be referred to as a rearward direction.

Although the display panel 110 will hereinafter be described based on a display panel employing organic light-emitting diodes (OLED), the display panel 110 applicable to the present disclosure is not limited thereto.

Figure 2:
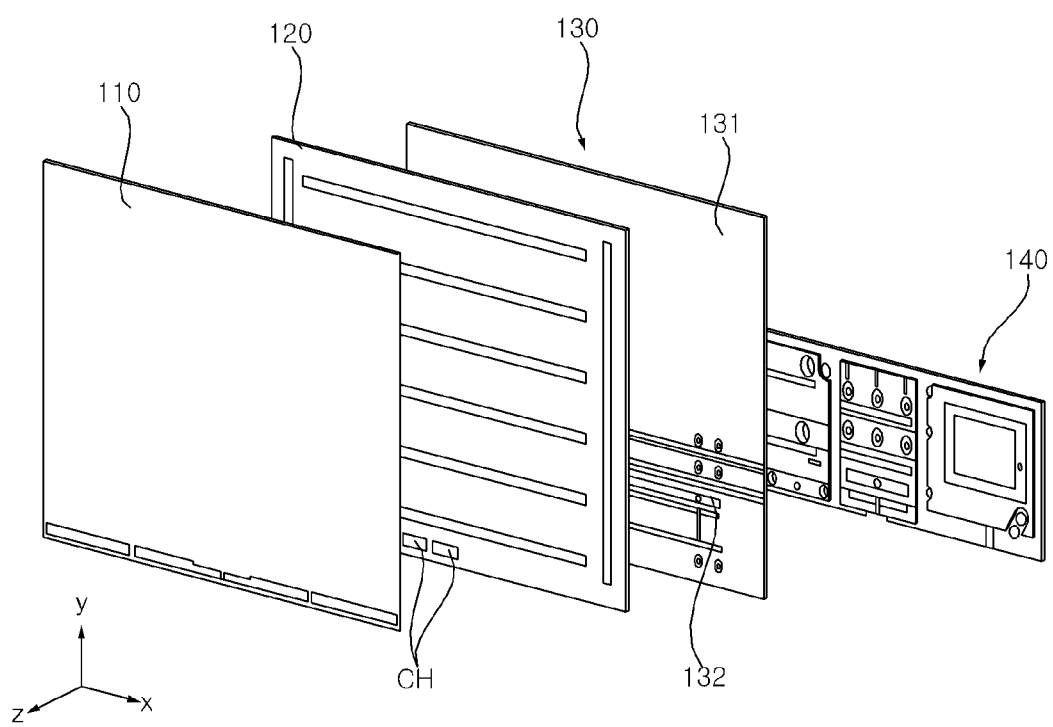

Referring to FIG. 2, the display device 100 may include the display panel 110, a plate 120, a frame 130 and a back cover 140.

The display panel 110 may define the front surface of the display device 100, and may display an image on the front surface of the display device 100. The display panel 110 may divide an image into a plurality of pixels, and may control the color, brightness and chroma of each of the pixels, thereby outputting the image. The display panel 110 may be divided into an active area, in which an image is displayed, and an inactive area, in which an image is not displayed. The display panel 110 may generate light corresponding to red, green or blue in response to a control signal.

The plate 120 may be positioned behind the display panel 110. The plate 120 may be configured to have a shape corresponding to the overall shape of the display panel 110. The plate 120 may absorb heat generated from the display panel 110 during operation of the display device 100, and/or heat, which is generated from a PCB coupled to the frame 130, which will be described later. The heat absorbed into the plate 120 may be uniformly dispersed throughout the plate 120.

Accordingly, it is possible to prevent the occurrence of local hot spots on the display panel 110 due to the heat generated during operation of the display device 100. Here, the plate 120 may be referred to as an inner plate, a radiation plate or a heat sink. The plate 120 may increase the torsional rigidity and/or the bending rigidity of the display device 100. For example, the plate 120 may include a metal material.

The frame 130 may be positioned behind the plate 120. The frame 130 may be configured to have a plate shape overall. A PCB (not shown), on which a plurality of electronic elements are positioned, may be mounted on the frame 130. Here, the frame 130 may be referred to as a frame, a flat frame or a module cover. For example, the frame 130 may include a metal material.

The back cover 140 may be coupled to the frame 130. The back cover 140 may cover the rear surface of the frame 130. For example, the back cover 140 may cover the rear surface of a portion of the frame 130. In this case, the portion of the frame 130 that is not covered by the back cover 140 and the back cover 140 may collectively define the rear surface of the display device 100.

Each of the plate 120 and the frame 130 may be provided therethrough with cable holes CH, through which cables (not shown) electrically connected to the display panel 110 extend.

The PCB (not shown) may be coupled to the rear surface of the frame 130. The PCB may generate heat during the operation thereof, and may be referred to simply as a board.

For example, the PCB may include a power supply board for supplying power to individual components of the display device 100, a timing controller board for providing an image signal to the display panel 110, and a main board for controlling the individual components of the display device 100. The plurality of PCBs may be electrically connected to each other and to the individual components of the display device 100.

Figure 3:
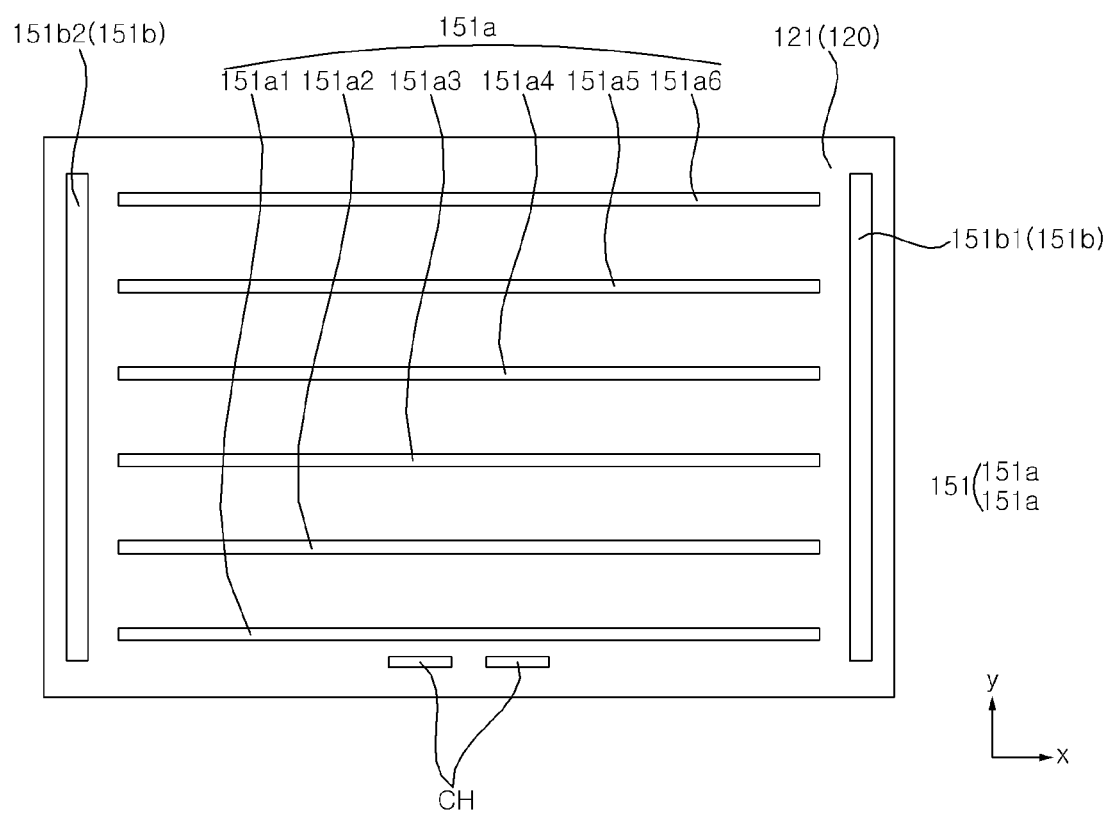

Referring to FIG. 3, a first adhesive member 151 may be coupled to the front surface of the plate 120. For example, the first adhesive member 151 may include a plurality of first adhesive members. In this case, the plurality of first adhesive members 151 may include vertical adhesive members 151b, which are respectively adjacent to the right side and the left side of the plate 120 and extend in the vertical direction UD, and horizontal adhesive members 151a, which extend in a lateral direction LR and which are sequentially arranged in the vertical direction UD.

In this case, the plate 120 may be coupled to the rear surface of the display panel 110 via the first adhesive members 151. For example, the first adhesive members 151 may be a plurality of pieces of double-sided adhesive tape.

Figure 4:
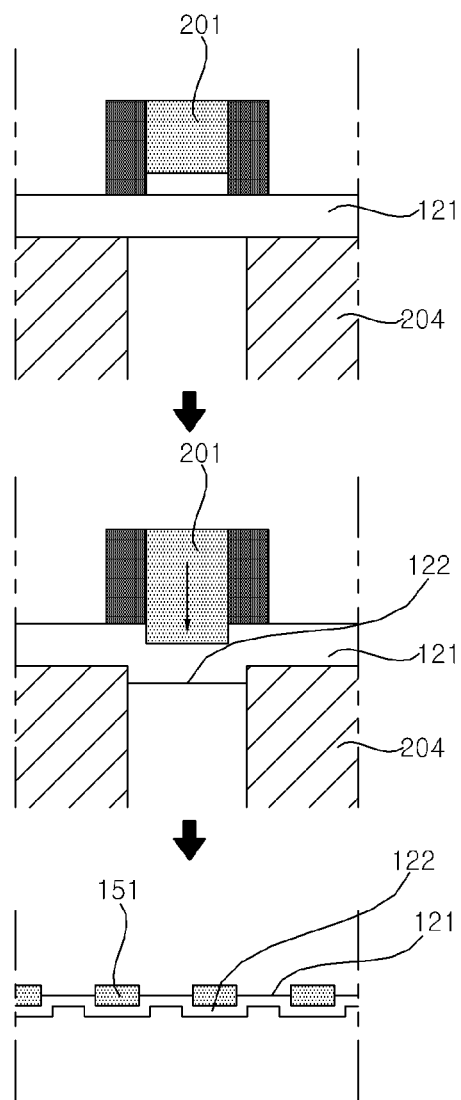

Referring to FIGS. 3 and 4, the plate 120 may include a body 121 and depressed portions 122. The body 121 may face the display panel 110. The depressed portions 122 may be depressed from the body 121 rearwards, and the first adhesive members 151 may be coupled to the depressed portions 122.

The plate 120 may be placed on a die 204 such that the rear surface of the body 121 comes into contact with the upper surface of the die 204, and then a forming device 201 may be positioned at the portion of the body at which the depressed portion 122 will be formed. Subsequently, by the action of the forming device 201, the depressed portion 122, which is depressed further rearwards than the remaining portion of the body 121, may be formed. The depressed portion 122 may include a plurality of depressed portions 122, which are spaced apart from each other with the body 121 interposed therebetween.

Here, the front surface of the depressed portion 122 may be depressed rearwards from the front surface of the body 121 while the rear surface of the depressed portion 122 may project rearwards from the rear surface of the body 121. In other words, the bodies 121 and the depressed portions 122 may be alternately formed at each of the front and rear surfaces of the plate 120.

Figure 5:
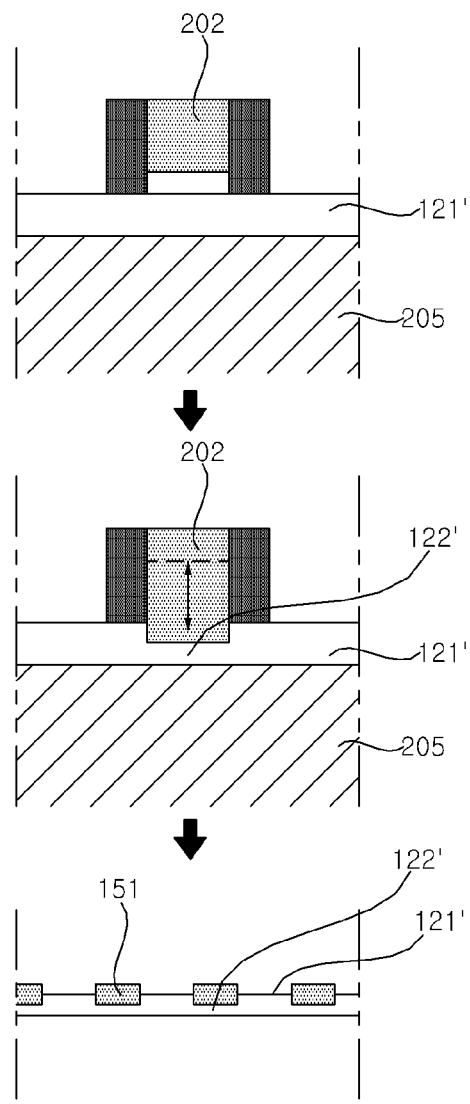

Referring to FIGS. 3 and 5, the first adhesive members 151 may be coupled to depressed portions 122' in a plate 120'.

The plate 120' may be placed on a die 205 such that the rear surface of a body 121' comes into contact with the upper surface of the die 205, and then a press device 202 may be positioned at the portion of the body 121' at which the depressed portion 122' will be formed. Subsequently, by forging action of the press device 202, the depressed portion 122', which is depressed further rearwards than the remaining portion of the body 121', may be formed. The depressed portion 122' may include a plurality of depressed portions 122', which are spaced apart from each other with the body 121' interposed therebetween.

Here, the front surface of the depressed portion 122' may be depressed rearwards from the front surface of the body 121' while the rear surface of the depressed portion 122' may be flush with the rear surface of the body 121'. In other words, the bodies 121' and the depressed portions 122' may be alternately formed at the front surface of the plate 120, but the rear surface of the plate 120' may be flat.

Figure 6:
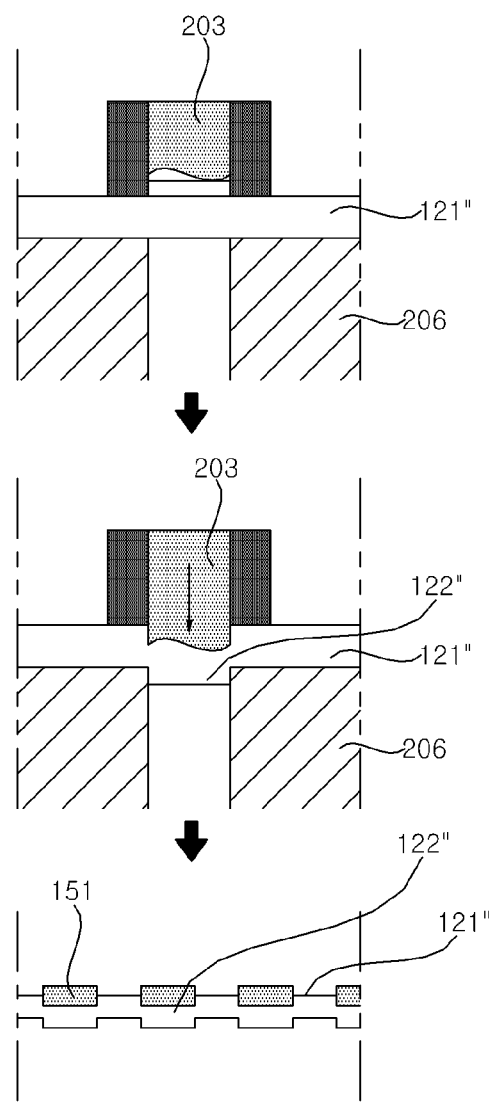

Referring to FIGS. 3 and 6, the first adhesive members 151 may be coupled to depressed portions 122" in a plate 120".

The plate 120" may be placed on a die 206 such that the rear surface of a body 121" comes into contact with the upper surface of the die 206, and then a piercing device 202 may be positioned at the portion of the body 121" at which the depressed portion 122" will be formed. Subsequently, by a halfway piercing action of the piercing device 203, that is, by an action in which the piercing device 203 is stopped before the body 121" is completely pierced, the depressed portion 122", which is depressed further rearwards than the remaining portion of the body 121", may be formed. The depressed portion 122" may include a plurality of depressed portions 122", which are spaced apart from each other with the body 121" interposed therebetween.

Here, the front surface of the depressed portion 122" may be depressed rearwards from the front surface of the body 121" while the rear surface of the depressed portion 122" may project rearwards from the rear surface of the body 121". In other words, the bodies 121" and the depressed portions 122" may be alternately formed at each of the front and rear surfaces of the plate 120".

Referring to FIG. 3, the depressed portion 122 may be depressed rearwards from the body 121 so as to form a step 123. Here, the width of the step 123 may be smaller than any of the width of the depressed portion 122 and the body 121. For example, the length Lc of the step 123 may be less than any of the length La of the body 121 and the length Lb of the depressed portion 122 in the lateral direction LR.

The front surface of the depressed portion 122 may be coupled to the rear surface of the display panel 110 via the first adhesive member 151 interposed therebetween. Here, because the front surface of the body 121 is positioned further rearwards than the front surface of the first adhesive member 151, the front surface of the body 121 may be spaced apart from the rear surface of the display panel 110 by a first distance d1. In other words, the thickness to of the first adhesive member 151 may be larger than the first distance d1. Consequently, the front surface of the body 121 may be positioned between the front surface and the rear surface of the first adhesive member 151.

Accordingly, although the body 121 of the plate 120 is not coupled to the rear surface of the display panel 110 via the first adhesive member 151, the body 121 of the plate 120 may be positioned closer to the rear surface of the display panel 110 than to the depressed portion 122, thereby easily receiving heat from the display panel 110. Specifically, compared to the case in which the portion of the plate 120 to which the adhesive member for coupling the plate 120 to the display panel 110 is coupled, and the remaining portion of the plate 120 are flush with each other, it is possible to reduce the air gap between the display panel 110 and the plate 120 and it is thus possible to prevent the temperature of the display panel 110 from excessively rising during the operation of the display device 100.

The end of the frame 130 may be bent so as to form a bent portion 131. The bent portion 131 may cover the lateral surfaces of the display panel 110 and the plate 120. A portion of the bent portion 131 may become flat so as to define the lateral appearance of the display device 100.

Figure 7:
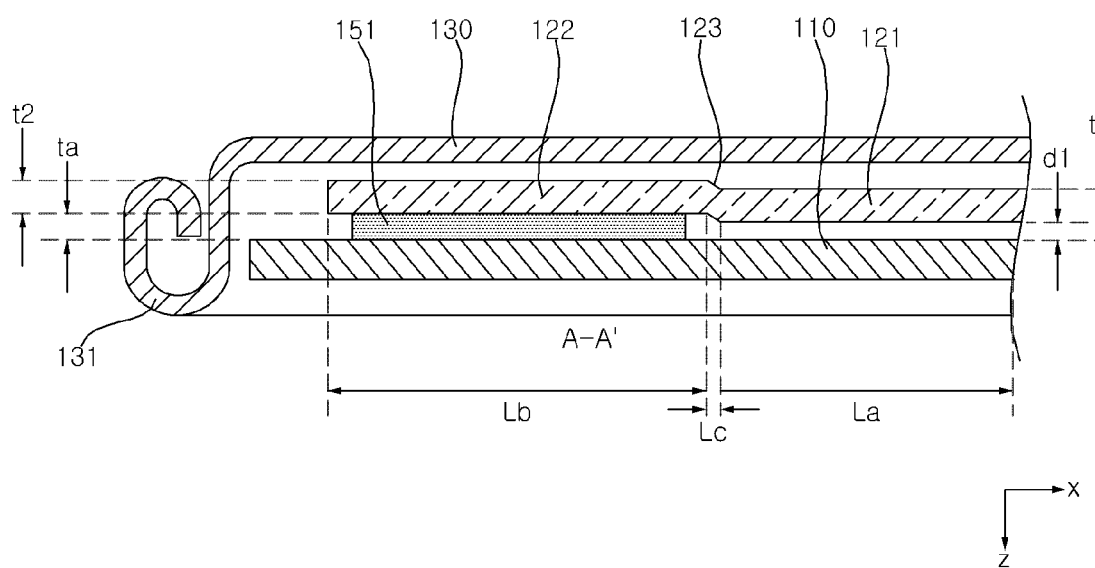
Figure 8:
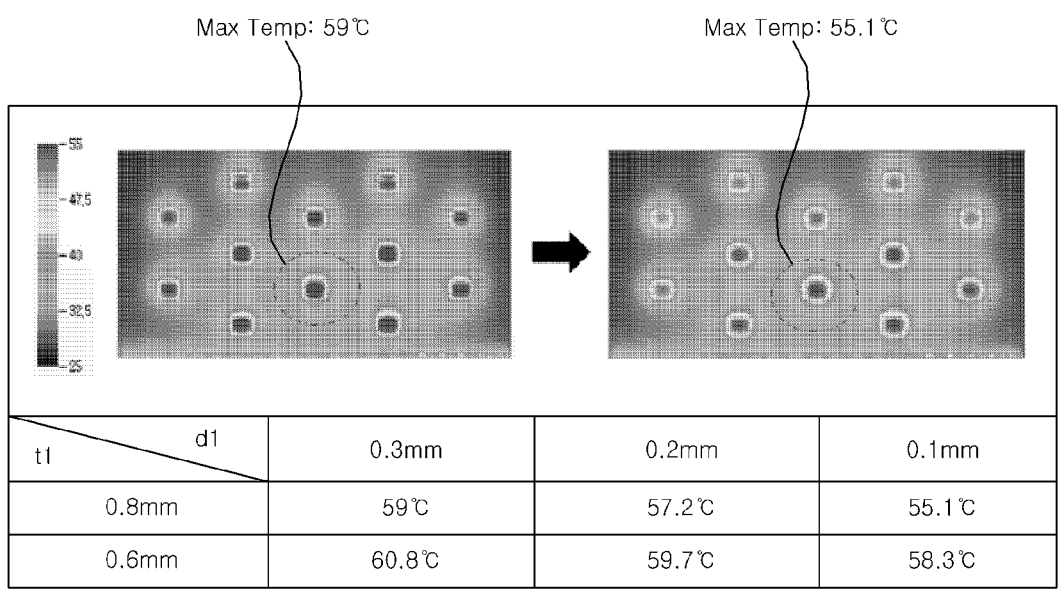

Referring to FIGS. 7 and 8, the overheating prevention performance of the display panel 110 due to the relationship between the thickness t1 of the body 121 and the first distance d1 will be appreciated. The thickness t1 of the body 121 may be same as or different from the thickness t2 of the depressed portion 122.

When the thickness t1 of the body 121 is constant, the overheating prevention performance of the display panel 110 may be improved as the first distance d1 decreases. Specifically, when the thickness t1 of the body 121 is 0.6 mm and the first distance d1 is 0.3 mm, 0.2 mm and 0.1 mm, the temperature of a specific portion of the display panel 110 may increase to 60.8° C., 59.7° C. and 58.3° C.

Furthermore, when the thickness t1 of the body 121 is 0.8 mm and the first distance d1 is each of 0.3 mm, 0.2 mm and 0.1 mm, temperature of a specific portion of the display panel 110 may increase to 59° C. (the upper left figure in the table), 57.2° C. and 55.1° C. (the upper right figure in the table).

In addition, it is found that, when the first distance d1 is constant, the overheating prevention performance of the display panel 110 is improved as the thickness t1 of the body 121 increases.

Accordingly, by positioning the body 121 having a relatively large thickness close to the rear surface of the display panel 110, it is possible to prevent the occurrence of an afterimage or a black blot on the display panel 110 due to heat generation from the display panel 110 itself and/or heat generation from the PCB coupled to the frame 130 during the operation of the display device 100.

Figure 9:
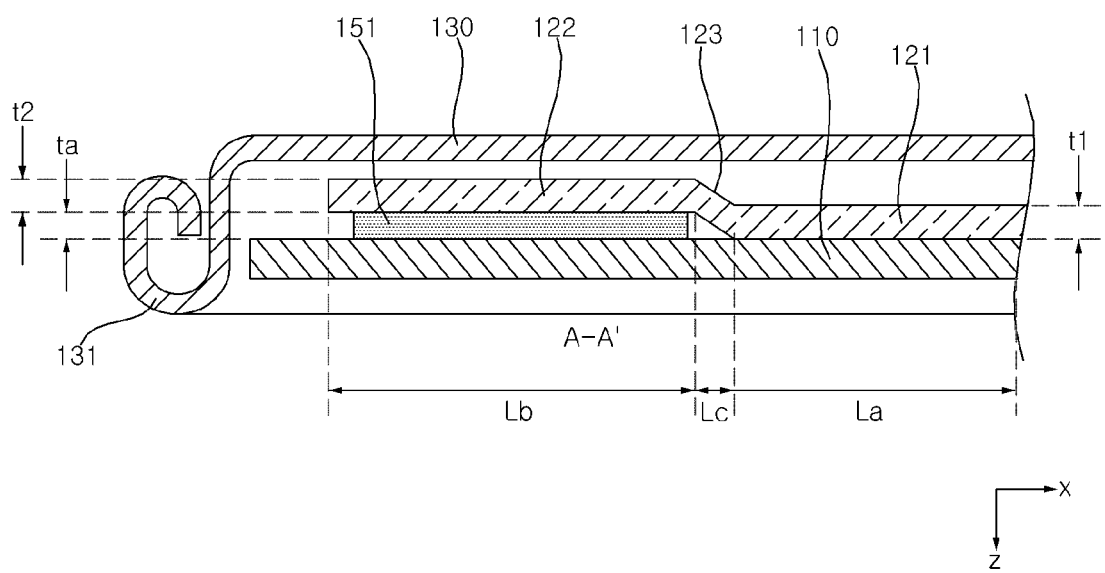

Referring to FIG. 9, the front surface of the body 121 may be flush with the front surface of the first adhesive member 151 so as to be in contact with the rear surface of the display panel 110.

Accordingly, since there is no gap between the front surface of the body 121 and the rear surface of the display panel 110, it is possible to efficiently receive heat from the display panel 110.

In addition, since the length Lc of the step 123 is less than any of the length La of the body 121 and the length Lb of the depressed portion 122 in the lateral direction LR, it is possible to minimize a decrease in heat transfer performance in the zone of the step 123.

Figure 10:
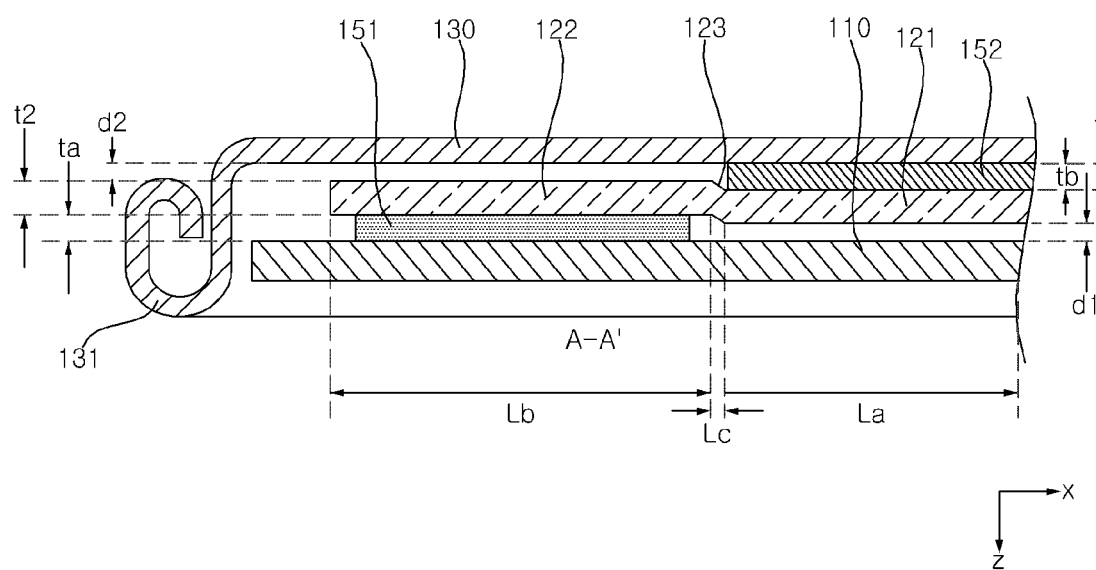

Referring to FIG. 10, a second adhesive member 152 may be disposed between the plate 120 and the frame 130, and may be coupled thereto. For example, the second adhesive member 152 may be a piece of double-sided adhesive tape.

The rear surface of the body 121 may be positioned behind the rear surface of the depressed portion 122, and the second adhesive member 152 may be coupled to the rear surface of the body 121. The rear surface of the depressed portion 122 may be positioned in front of the rear surface of the second adhesive member 152 so as to be spaced apart from the front surface of the frame 130 by a second distance d2. In other words, the thickness tb of the second adhesive member 152 may be greater than the second distance d2. Consequently, the rear surface of the depressed portion 122 may be positioned between the rear surface and the front surface of the second adhesive member 152.

Accordingly, since the depressed portion 122 of the plate 120 is positioned closer to the front surface of the frame 130 than to the body 121 even though the depressed portion 122 is not coupled to the front surface of the frame 130, it is possible to efficiently receive heat from the PCB coupled to the rear surface of the frame 130. In other words, since the air gap between the plate 120 and the frame 130 is decreased compared to the case in which the portion of the plate 120 to which the second adhesive member 152 is coupled and the remaining portion of the plate 120 to which the second adhesive member 152 is not coupled, are aligned with each other, it is possible to prevent the temperature of the display panel 110 from excessively rising during operation of the display device 100.

Figure 11:
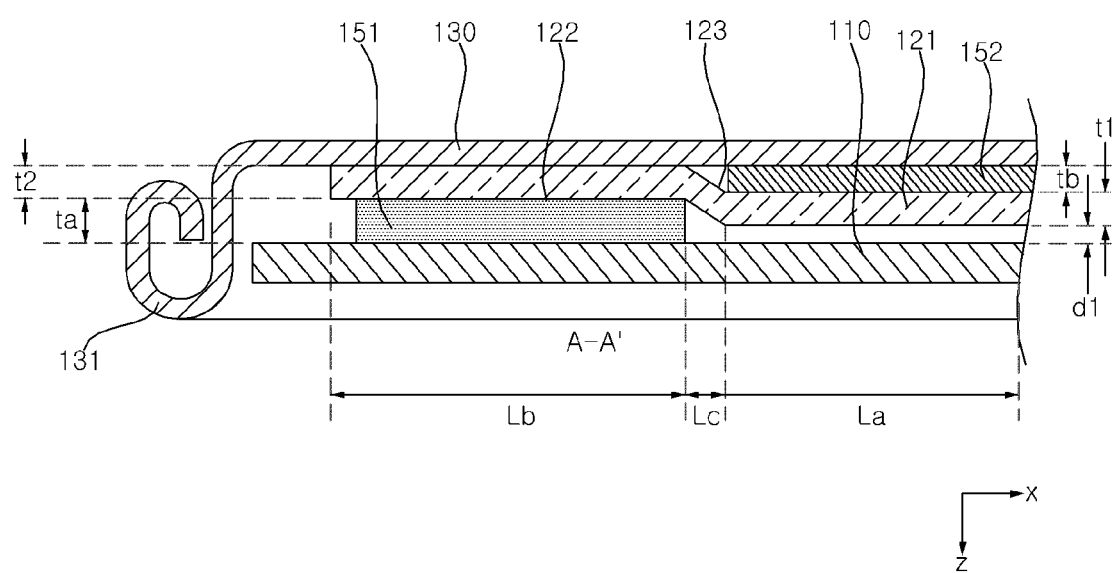

Referring to FIG. 11, the rear surface of the depressed portion 122 may be flush with the rear surface of the second adhesive member 152 so as to be in contact with the front surface of the frame 130.

Accordingly, since there is no gap between the rear surface of the depressed portion 122 and the front surface of the frame 130, it is possible to more efficiently receive heat from the PCB coupled to the rear surface of the frame 130.

Figure 12:
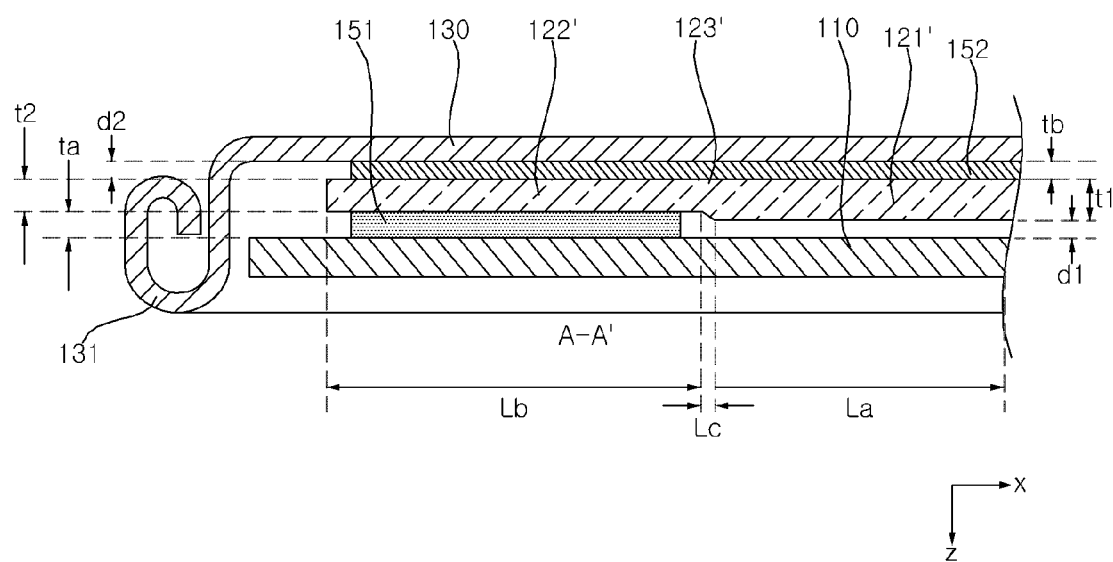

Referring to FIG. 12, the rear surface of a depressed portion 122' may be flush with the rear surface of a body 121'. In other words, the rear surface of a plate 120' may be flat. In this case, a second adhesive member 152' may be coupled to almost the entire area of the rear surface of the plate 120' and to the front surface of the frame 130.

Accordingly, since the plate 120' is coupled to the frame 130 via the second adhesive member 152', it is possible to more efficiently receive heat from the PCB coupled to the rear surface of the frame 130.

Figure 13:
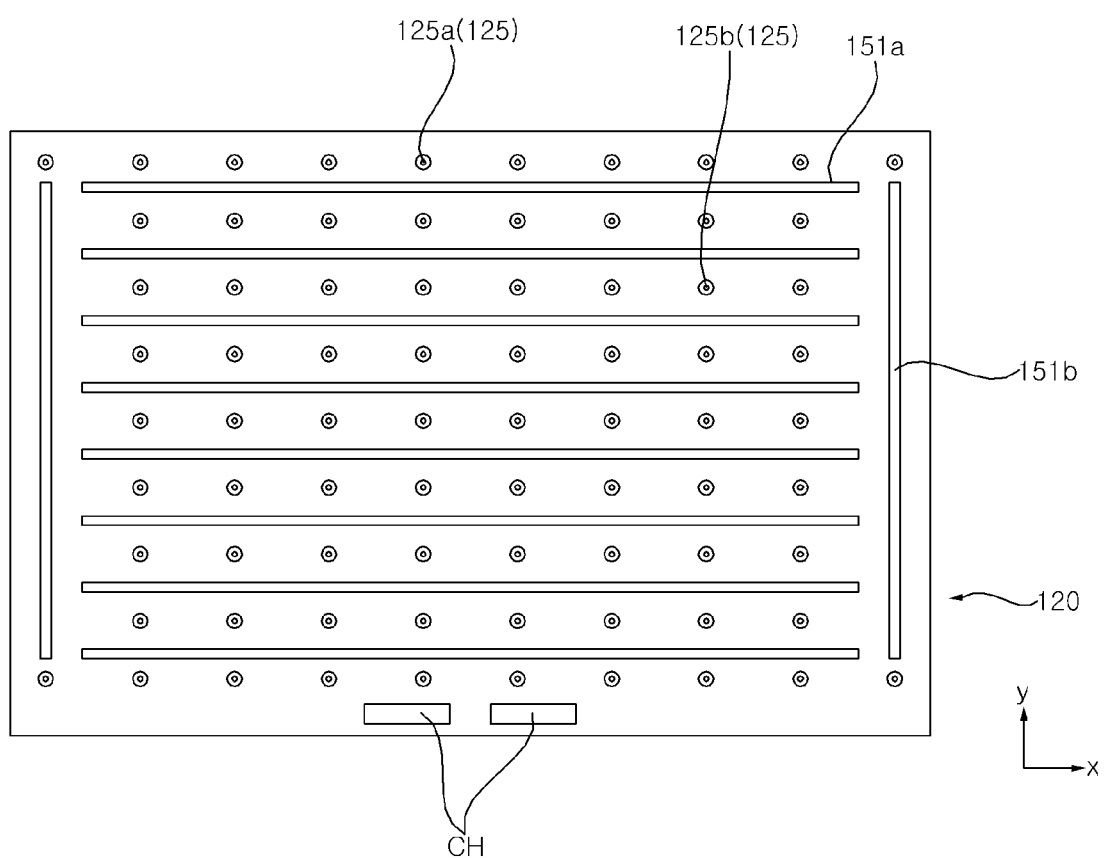

Referring to FIG. 13, a coupling region 125 may be formed on the front surface of the plate 120. For example, the coupling region 125 may include a plurality of coupling regions 125, which are uniformly dispersed on the front surface of the plate 120. The plurality of coupling regions 125 may be arranged on the plate 120 in a matrix pattern of M columns and N rows (M and N are natural numbers). The plurality of coupling regions 125 may include first coupling regions 125a, which are positioned adjacent to the edges of the plate 120, and second coupling regions 125b, which are inwardly spaced apart from the first coupling regions 125a.

In this case, the plate 120 and the frame 130 may be coupled to each other by being welded at the coupling regions 125. For example, each of the plate 120 and the frame 130 may include a metal material, and the welding may be of a laser type.

Figure 14:
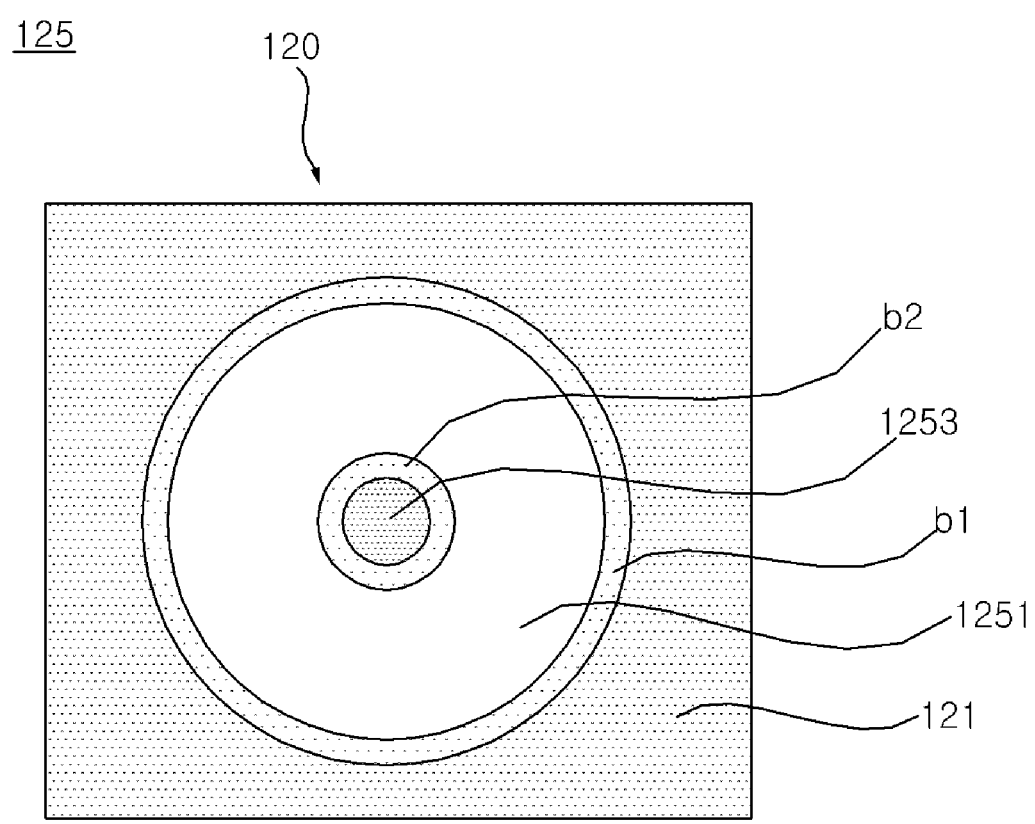
Figure 15:
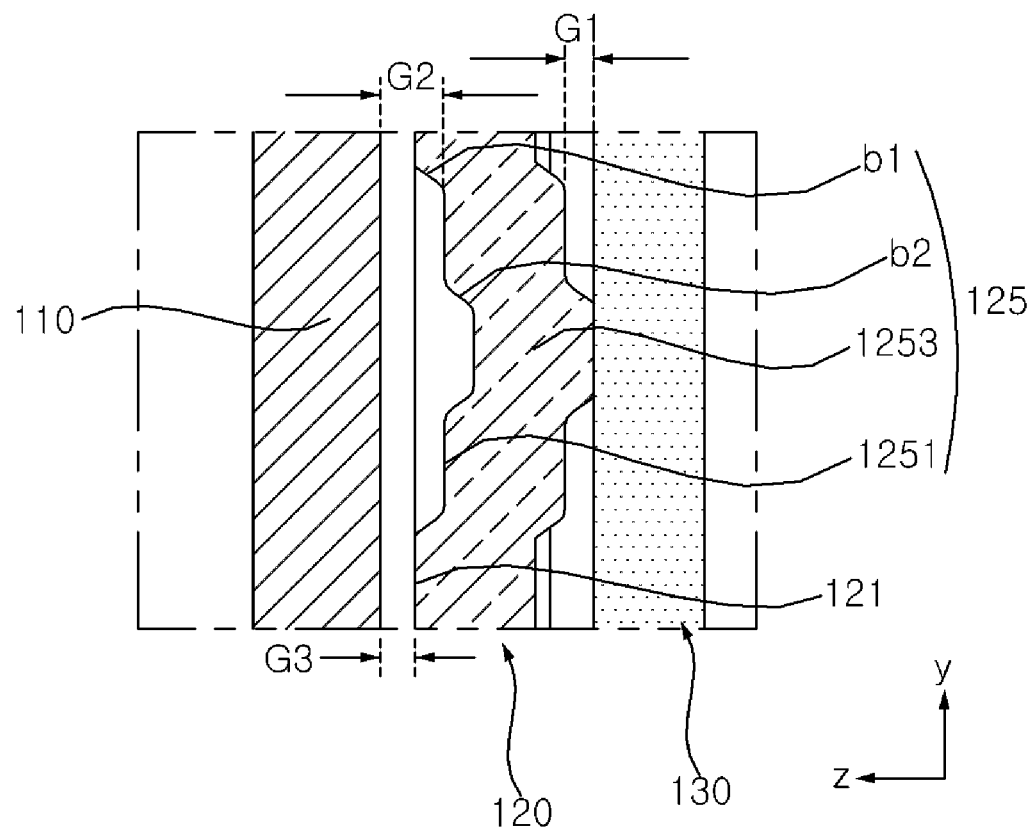

Referring to FIGS. 14 and 15, the coupling region 125 may include a welding portion 1251 and a supporting portion 1253. The welding portion 1251 may be formed so as to define a first step b1 with respect to the body 121 by subjecting the plate 120 to a pressing procedure. The supporting portion 1253 may be formed so as to define a second step b2 with respect to the welding portion 1251 by subjecting the plate 120 to a pressing procedure. In other words, the welding portion 1251 and the supporting portion 1253 may be formed so as to have a multistep shape by subjecting the plate 120 to a pressing procedure.

The frame 130 may support the support portion 1253 and the front surface of the frame 130 may be in contact with the rear surface of the support portion 1253. The welding portion 1251 may be formed at the outer periphery of the supporting portion 1253 so as to define the second step b2 with respect to the supporting portion 1253, and may extend from the supporting portion 1253. The body 121 may be formed at the outer periphery of the welding portion 1251 so as to define the first step b1 with respect to the welding portion 1251, and may extend from the welding portion 1251.

A first gap G1 may be defined between the welding portion 1251 and the frame 130. The first gap G1 may provide a space for receiving the gas that is generated while a laser is applied to the welding portion 1251 and the welding portion 1251 melts. Accordingly, since the welding portion 1251 melts and penetrates the frame 130 without generating gaseous impurities, it is possible to improve welding quality.

A second gap G2 may be defined between the display panel 110 and the welding portion 1251. Accordingly, the second gap G2 may receive a bulging portion of the welding portion 1251, which is formed when the welding portion 1251 melts, and the display panel 110 may be positioned parallel to the plate 120.

A third gap G3 may be defined between the display panel 110 and the body 121. The third gap G3 may be smaller than the second gap G2. Accordingly, heat generated from the display panel 110 may be efficiently transmitted to the body 121 of the plate 120, thereby realizing efficient heat dissipation from the display panel 110.

Figure 16:
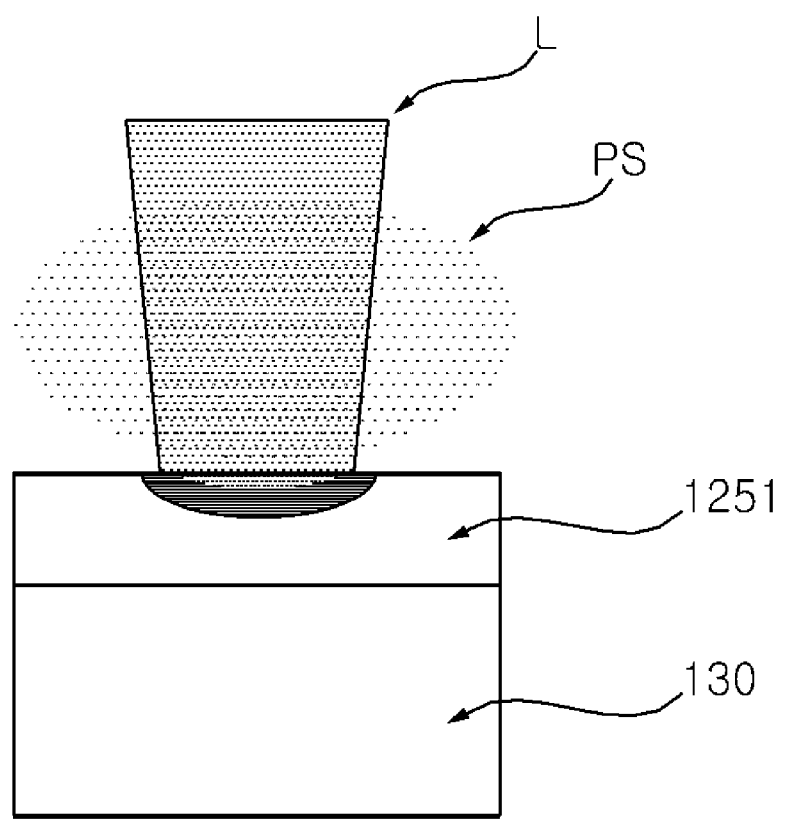
Figure 18:
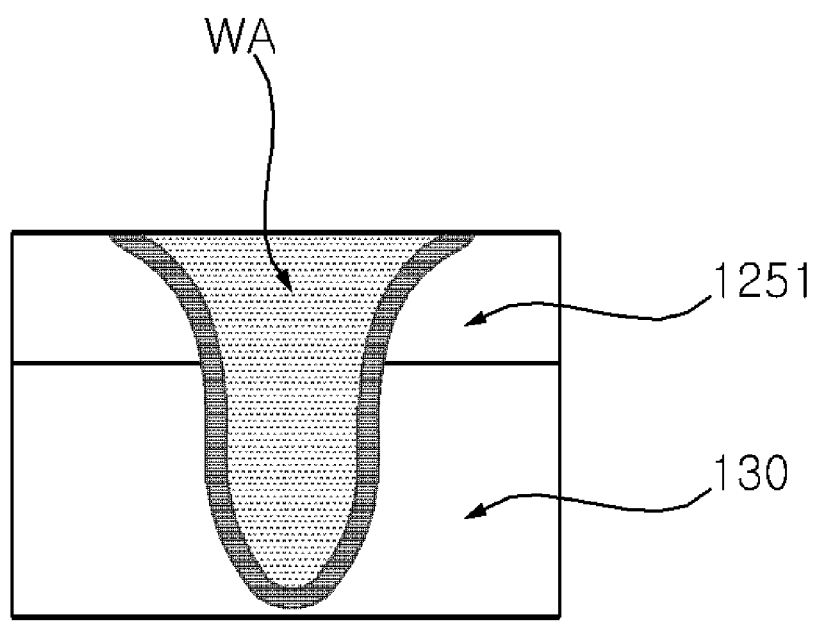

Referring to FIGS. 16 and 18, by radiating a laser L onto the welding portion 1251, the welding portion 1251 may be welded and coupled to the frame 130.

Referring to FIG. 16, the laser L may be radiated to the front surface of the plate 120. For example, the front surface of the plate 120 may correspond to the welding portion 1251. When the laser L is radiated, the welding portion 1251 may be heated, and plasma PS may be generated in front of the plate 120.

Figure 17:
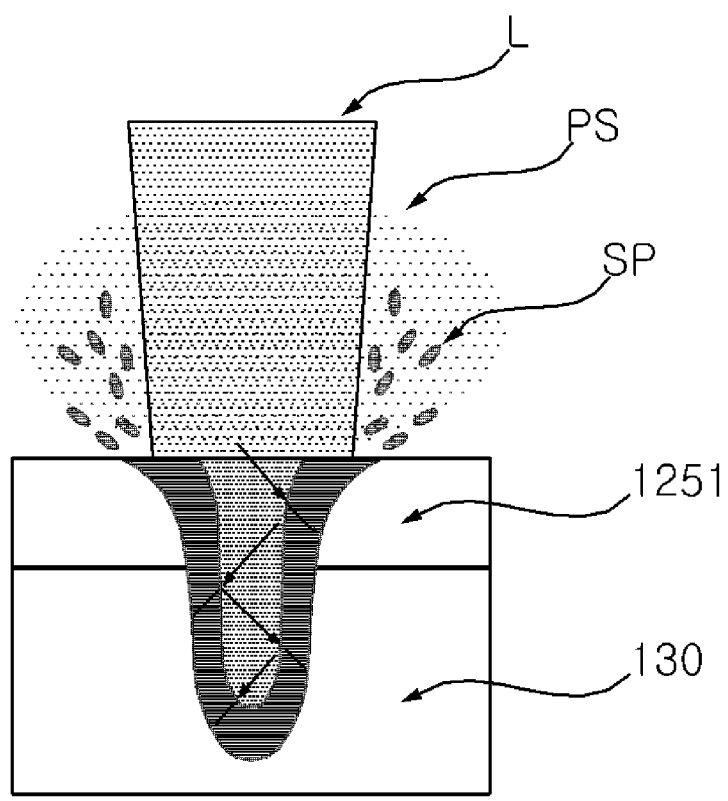

Referring to FIG. 17, as the welding portion 1251 of the plate 120 melts, the frame 130 may also be heated and melted. At this time, not only the plasma PS but also sputtered particles SP may be dispersed in front of the plate 120. The laser L may be partially reflected from the molten surface of the welding portion 1251, and may be partially absorbed in the molten surface.

Referring to FIG. 18, when the radiation of the laser L is completed, the welding portion 1251 and the molten portion WA of the frame 130 may solidify, and the plate 120 may be securely coupled to the frame 130. Here, the solidified molten portion WA may be referred to a conjunction WA or a bead WA.

Figure 19:
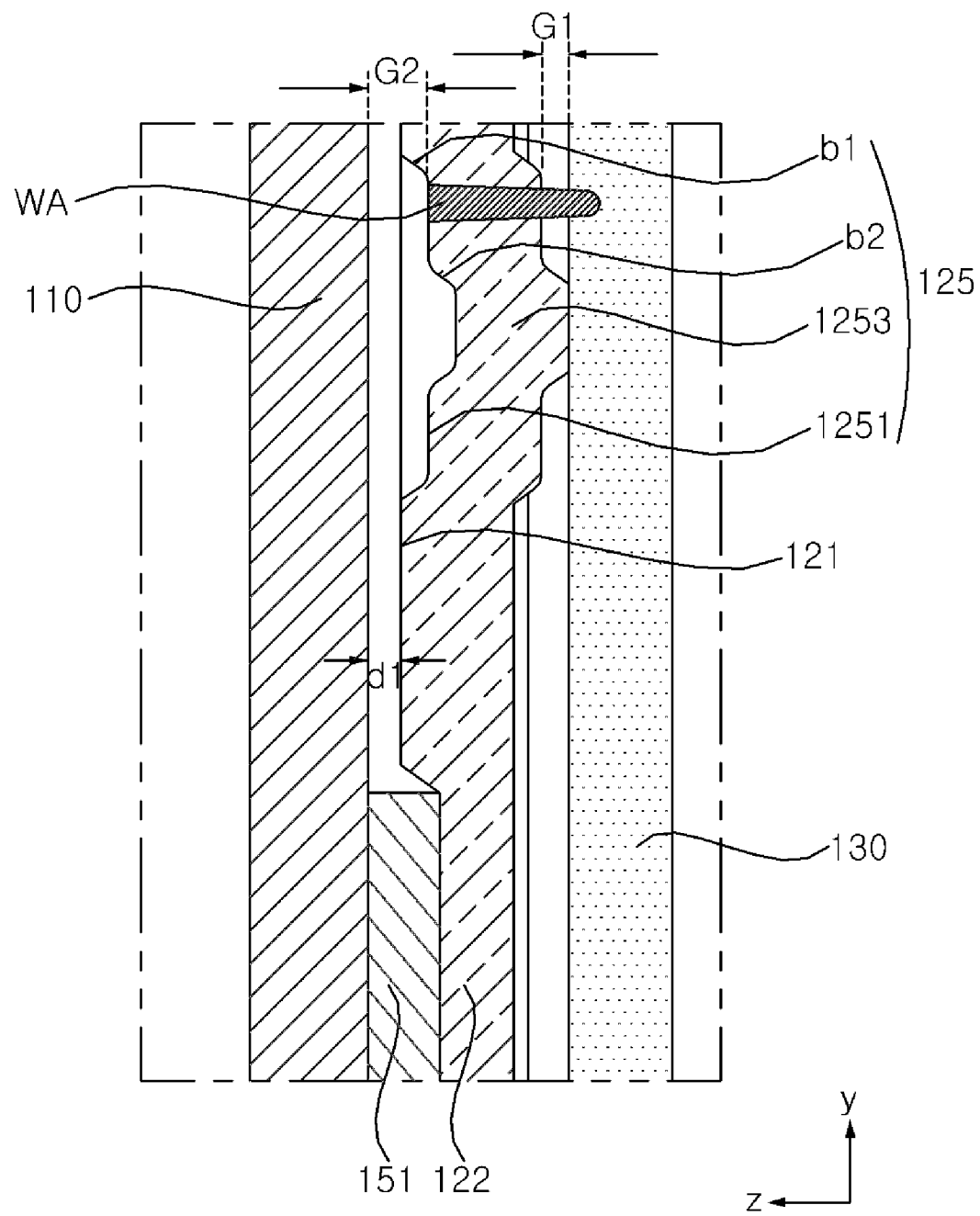

Referring to FIG. 19, the conjunction WA may be formed in the welding portion 1251 of the plate 120 and in a portion of the frame 130. In other words, the conjunction WA may connect the welding portion 1251 to the frame 130 in the first gap G1. The conjunction WA formed in the welding portion 1251 of the plate 120 may be formed throughout the entire thickness of the plate 120. The conjunction WA formed in the frame 130 may be formed through a portion of the thickness of the frame 130. The depth of the conjunction WA formed in the frame 130 may be referred to as a penetration depth.

For example, the conjunction WA formed in the frame 130 may be formed to be about 40% as thickness as the frame 130. In other words, the thickness of the remaining portion of the frame 130 excluding the conjunction WA may be about 60% or more of the overall thickness of the frame 130.

Consequently, it is possible to securely couple the plate 120 to the frame 130, and it is possible to prevent damage to the rear surface of the frame 130 due to laser welding.

In accordance with an aspect of the present disclosure, provided is a display device including a display panel, a frame positioned behind the display panel, a plate positioned between the display panel and the frame, and a first adhesive member disposed between the display panel and the plate and coupled both to the display panel and to the plate, wherein the plate includes a body facing the display panel and a depressed portion, which is depressed rearwards from the body and to which the first adhesive member is coupled.

In accordance with another aspect of the present disclosure, the depressed portion may include a plurality of depressed portions, which are spaced apart from each other with the body interposed therebetween.

In accordance with another aspect of the present disclosure, a front surface of the body may be positioned behind a front surface of the first adhesive member so as to be rearwardly spaced apart from a rear surface of the display panel.

In accordance with another aspect of the present disclosure, the front surface of the body may be positioned between the front surface of the first adhesive member and a rear surface of the first adhesive member.

In accordance with another aspect of the present disclosure, a front surface of the body may be positioned parallel to a front surface of the first adhesive member so as to be in contact with a rear surface of the display panel.

In accordance with another aspect of the present disclosure, the depressed portion may be depressed rearwards from the body so as to define a step, and the step may have a smaller width than any of a width of the depressed portion and a width of the body.

In accordance with another aspect of the present disclosure, the display device may further include a second adhesive member disposed between the plate and the frame and coupled both to the plate and to the frame, wherein a rear surface of the body may be positioned in front of a rear surface of the depressed portion, and may be coupled to the second adhesive member.

In accordance with another aspect of the present disclosure, the rear surface of the depressed portion may be positioned in front of a rear surface of the second adhesive member so as to be spaced apart from a front surface of the frame.

In accordance with another aspect of the present disclosure, the rear surface of the depressed portion may be flush with a rear surface of the second adhesive member so as to be in contact with a front surface of the frame.

In accordance with another aspect of the present disclosure, the display device may further include a second adhesive member disposed between the plate and the frame and coupled both to the plate and to the frame, and a rear surface of the body may be flush with a rear surface of the depressed portion.

In accordance with another aspect of the present disclosure, the plate may include a coupling region, which is depressed rearwards from the body, and the plate and the frame may be welded and coupled to each other at the coupling region.

In accordance with another aspect of the present disclosure, the coupling region may include a welding portion, which is formed so as to define a first step with respect to the body by subjecting the plate to a pressing procedure and which is welded to the frame so as to define a conjunction, and a supporting portion, which is formed so as to define a second step with respect to the welding portion by subjecting the plate to a pressing procedure.

In accordance with another aspect of the present disclosure, a first gap may be defined between the welding portion and the frame, and the conjunction may connect the welding portion to the frame in the first gap.

The effects of the display device according to the present disclosure will be described.

At least one embodiment of the present disclosure provides a display device capable of preventing the temperature of the display panel from excessively rising by reducing the distance between the display panel and the plate serving as a radiating plate.

At least one embodiment of the present disclosure provides a display device capable of reducing the distance between the plate and the display panel by forming a step at at least a portion of the plate in consideration of the thickness of the adhesive member coupled both to the display panel and to the plate.

Certain embodiments or other embodiments of the disclosure described above are not mutually exclusive or distinct from each other. Any or all elements of the embodiments of the disclosure described above may be combined with each other in configuration or function.

For example, a configuration "A" described in one embodiment of the disclosure and the drawings and a configuration "B" described in another embodiment of the disclosure and the drawings may be combined with each other. That is, even if the combination between the configurations is not directly described, the combination is possible except in the case where it is described that the combination is impossible.

Although embodiments have been described with reference to a number of illustrative embodiments thereof, it should be understood that numerous other modifications and embodiments that fall within the scope of the principles of this disclosure can be devised by those skilled in the art. More particularly, various variations and modifications are possible in the component parts and/or arrangements within the scope of the disclosure, the drawings and the appended claims. In addition to variations and modifications in the component parts and/or arrangements, alternative uses will also be apparent to those skilled in the art.

What is claimed is:

1. A display device comprising:
   a display panel;
   a frame positioned behind the display panel;
   a plate positioned between the display panel and the frame;
   a first adhesive member disposed between the display panel and the plate; and
   a second adhesive member disposed between the plate and the frame,
   wherein the plate comprises:
   a body facing the display panel; and
   a depressed portion pressed from the body toward the frame,
   wherein the display panel is closer to the body than the depressed portion,
   wherein the frame is closer to the depressed portion than the body,
   wherein the first adhesive member is coupled to a rear surface of the display panel and a front surface of the depressed portion, and
   wherein the second adhesive member is coupled to a rear surface of the body and a front surface of the frame, and does not overlap with the first adhesive member in a thickness direction of the plate.

2. The display device according to claim 1, wherein the depressed portion comprises a plurality of depressed portions, which are spaced apart from each other with the body interposed therebetween.

3. The display device according to claim 1, wherein a front surface of the body is positioned behind a front surface of the first adhesive member so as to be rearwardly spaced apart from the rear surface of the display panel.

4. The display device according to claim 3, wherein the front surface of the body is positioned between the front surface of the first adhesive member and a rear surface of the first adhesive member.

5. The display device according to claim 1, wherein a front surface of the body is positioned parallel to a front surface of the first adhesive member so as to be in contact with the rear surface of the display panel.

6. The display device according to claim 1, wherein a stepped portion is formed between the depressed portion and the body, and the stepped portion has a smaller width than any of a width of the depressed portion and a width of the body.

7. The display device according to claim 1, wherein the rear surface of the depressed portion is positioned in front of a rear surface of the second adhesive member so as to be spaced apart from the front surface of the frame.

8. The display device according to claim 1, wherein the rear surface of the depressed portion is flush with a rear surface of the second adhesive member so as to be in contact with the front surface of the frame.

9. The display device according to claim 1, wherein the plate comprises a coupling region, which is depressed rearwards from the body, and the plate and the frame are welded and coupled to each other at the coupling region.

10. The display device according to claim 9, wherein the coupling region comprises:
    a welding portion, which is formed so as to define a first step with respect to the body by subjecting the plate to a pressing procedure and which is welded to the frame so as to define a conjunction; and
    a supporting portion, which is formed so as to define a second step with respect to the welding portion by subjecting the plate to a pressing procedure.

11. The display device according to claim 10, wherein a first gap is defined between the welding portion and the frame, and the conjunction connects the welding portion to the frame in the first gap.

* * * * *